United States Patent [19]

Maruhashi et al.

[11] Patent Number: 4,478,889
[45] Date of Patent: Oct. 23, 1984

[54] PROCESS FOR PREPARATION OF COATED PLASTIC CONTAINER

[75] Inventors: Yoshitsugu Maruhashi, Yokohama; Isao Tanikawa, Ayase; Sadao Hirata, Kamakura, all of Japan

[73] Assignee: Toyo Seikan Kaisha, Ltd., Tokyo, Japan

[21] Appl. No.: 438,758

[22] Filed: Nov. 3, 1982

[30] Foreign Application Priority Data

Nov. 5, 1981 [JP] Japan .............................. 56-176368

[51] Int. Cl.³ .......................................... B05D 7/22
[52] U.S. Cl. .................................. 427/230; 427/160; 427/379; 427/393.5
[58] Field of Search ............. 427/160, 230, 379, 393.5

[56] References Cited

U.S. PATENT DOCUMENTS 3,922,451 11/1975 Anschutz et al. .............. 427/230 X Primary Examiner—Bernard D. Pianalto
Attorney, Agent, or Firm—Sherman & Shalloway

[57] ABSTRACT

Disclosed is a process for the preparation of a coated plastic container, which comprises coating an aqueous latex or organic solvent solution of a vinylidene chloride copolymer on at least one surface of a plastic container formed by hot molding of a thermoplastic resin, drying the coating and crystallizing the coating simultaneously with or subsequently to the drying step.

In the coated plastic container prepared according to this process, the adhesion of the coating layer of the vinylidene chloride copolymer to the plastic container substrate is highly improved, and even under severe conditions, peeling of the coating layer is prevented. Moreover, the gas barrier property, strength and chemical resistance of the container are prominently improved.

13 Claims, 2 Drawing Figures

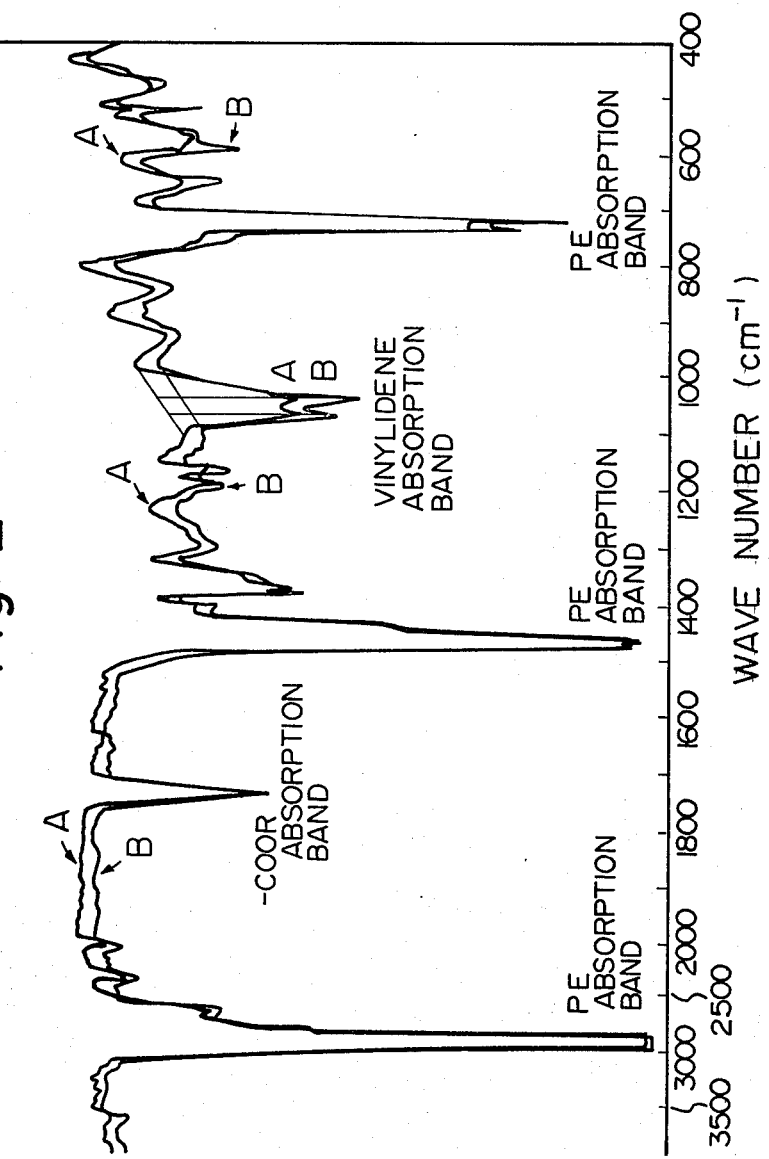

PROCESS FOR PREPARATION OF COATED PLASTIC CONTAINER

BACKGROUND OF THE INVENTION (1) Field of the Invention

The present invention relates to a process for the preparation of a coated plastic container. More particularly, the present invention relates to a process for the preparation of a coated plastic container in which the adhesion, gas barrier property, strength and chemical resistance can be improved by crystallizing a coating layer of a vinylidene chloride copolymer formed on a plastic container substrate.

(2) Description of the Prior Art

Plastic bottles prepared by melt-extruding and hollow-molding (blow-molding) thermoplastic plastics such as polyolefins are used in various fields instead of glass bottles because the plastic bottles have a lighter weight and a better shock resistance than the glass bottles.

General-purpose plastics such as polyolefins are excellent in the moisture resistance and sanitary characteristics, but the oxygen permeability coefficient is relatively high and in bottles of these plastics, permeation of oxygen through bottle walls is not negligible. Accordingly, bottles of general-purpose plastics are not suitable as vessels for preserving foods for a long time or as vessels for cosmetics and the like where a high flavor-retaining property is required.

As bottles in which this defect is overcome, there have been developed and proposed plastic bottles having a wall structure excellent in the oxygen barrier property. Among melt-extrudable thermoplastic resins which are now available, a saponified ethylene/vinyl acetate copolymer (ethylene/vinyl alcohol copolymer) is most excellent in the oxygen barrier property. However, this saponified copolymer is inferior in the moisture resistance, that is, the steam barrier property, and in this saponified copolymer, the oxygen permeability coefficient tends to increase as increase of the humidity. Accordingly, when this saponified copolymer is actually used for formation of plastic bottles, it is necessary to adopt a troublesome molding method in which this saponified copolymer is sandwiched by moisture-resistant resins such as polyolefins and the resulting laminate is fed to the molding step to form a multi-layer laminate bottle.

SUMMARY OF THE INVENTION

To our surprise, it was found that when a vinylidene chloride copolymer is coated in the form of an aqueous latex or organic solvent solution on the surface of a plastic container formed by hot molding and this coating layer is crystallized, the adhesion of the coating layer to the plastic bottle substrate is highly improved.

It is therefore a primary object of the present invention to provide a process for the preparation of a coated plastic container in which the adhesion of a coating layer of a vinylidene chloride copolymer to a plastic container substrate is highly improved.

Another object of the present invention is to provide a process for the preparation of a coated plastic container in which peeling of a coating layer is prevented even under such severe conditions that the content in the bottle is frozen or when the container undergoes such an extreme deformation as will crush the container at low temperatures.

Still another object of the present invention is to provide a process for the preparation of a coated plastic container in which not only the adhesion of a coating layer of a vinylidene chloride copolymer but also the gas barrier property, strength and chemical resistance are highly improved.

More specifically, in accordance with the present invention, there is provided a process for the preparation of a coated plastic container, which comprises coating an aqueous latex or organic solvent solution of a vinylidene chloride copolymer on at least one surface of a plastic container formed by hot molding of a thermoplastic resin, drying the coating and crystallizing the coating simultaneously with or subsequently to the drying step.

BRIEF DESCRIPTION OF THE DRAWINGS

FIG. 2 shows an infrared absorption spectrum of a coated film formed by coating a vinylidene chloride resin on a polyethylene film.

DETAILED DESCRIPTION OF THE PREFERRED EMBODIMENTS

Figure 1:
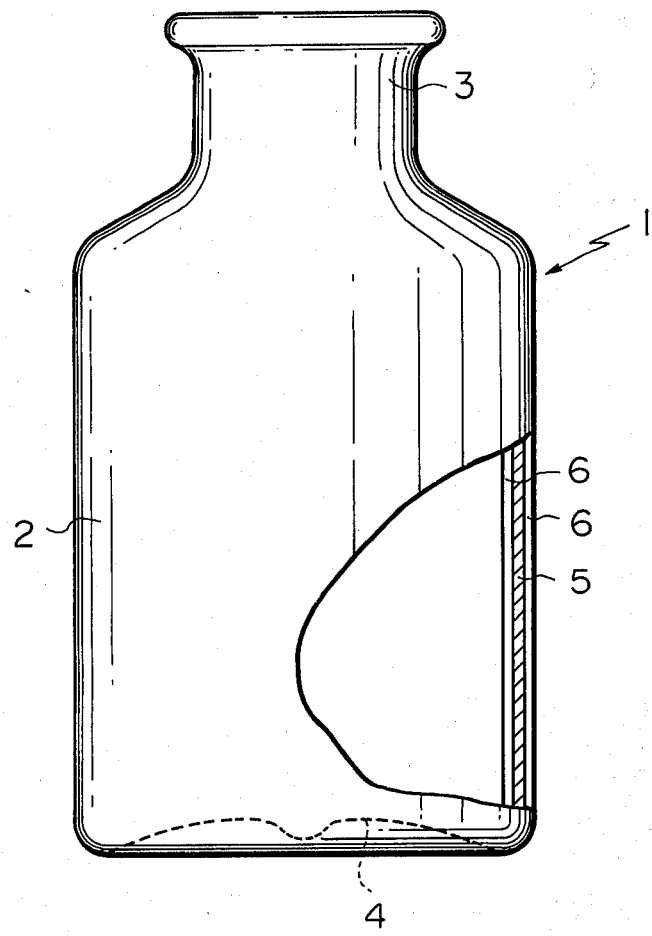
FIG. 1 is a partially sectional side view illustrating one embodiment of the plastic bottle according to the present invention.

Referring to FIG. 1 illustrating an embodiment of the coated plastic bottle of the present invention, this bottle 1 comprises a peripheral wall 2 having a circular or ellipsoidal section, a mouth portion 3 connected integrally to the peripheral wall 2 and a bottom portion 4 connected to the lower end of the peripheral wall 2. All of these bottle walls comprise a plastic bottle substrate 5 formed from a melt-moldable thermoplastic resin by blow molding, injection molding or biaxially drawing blow molding, and a coating layer 6 of a vinylidene chloride copolymer formed on the surface of the substrate 5. The coating layer 6 may be formed on both the surfaces of the bottle substrate 5 as shown in FIG. 1 or it may be formed only on the inner or outer surface of the bottle substrate 5.

It is known that a vinylidene chloride copolymer is a resin excellent in the oxygen barrier property. However, hot molding of this vinylidene chloride copolymer is difficult, and the copolymer should be handled in the form of an aqueous latex or organic solvent solution.

The critical feature of the present invention resides in the finding that, as pointed out hereinbefore, when a vinylidene chloride copolymer is coated in the form of an aqueous latex or organic solvent solution on the surface of a plastic container formed by hot molding and the coating layer is crystallized simultaneously with or subsequently to the drying of the coating layer, the adhesion of the coating layer to the plastic container substrate is highly improved.

In a coated plastic bottle formed by ordinarily coating a vinylidene chloride copolymer and drying the coating layer, the adhesion of the coating layer to the substrate seems good. However, when this coated bottle is placed under such severe temperature conditions that the content liquid is frozen or when it is crushed at low temperatures, the coating layer of the vinylidene chloride copolymer is readily peeled from the container substrate.

In the present invention, by positively crystallizing the vinylidene chloride copolymer constituting the coating layer just after the coating operation, the adhesion of the coating layer to the plastic container substrate is improved to such an extent that under the above-mentioned severe conditions, peeling is not substantially caused. This finding is quite unexpected from the common sense in the art of coating. More specifically, it has been considered that when a crystallizable thermoplastic resin is used as a coating layer, from the viewpoint of the adhesion of the coating layer, it is important that the resin should not be crystallized. Accordingly, in the conventional methods, there have been adopted rapid cooling means for passing the coating layer rapidly through the crystallization temperature range. In contrast, in the present invention, the coating layer is maintained in the crystallization temperature range for the vinylidene chloride copolymer for a relatively long time, thereby to effect crystallization. The fact that the adhesion is improved with crystallization will become apparent from Examples given hereinafter.

In order to attain the objects of the present invention, it is preferred that the coating layer of the vinylidene chloride copolymer be crystallized so that the degree of crystallization of the coating layer of the vinylidene chloride copolymer is at least 0.5, especially at least 0.8, as determined according to the infrared absorption spectrum method described hereinafter.

According to the present invention, by crystallizing the vinylidene chloride copolymer constituting the coating layer, the barrier properties to gases such as oxygen, carbon dioxide gas and steam can prominently be improved, and mechanical properties such as the tensile strength, impact resistance and abrasion resistance, the chemical resistance such as the alkali resistance and the hot water resistance such as the resistance to whitening by hot water can also be improved prominently. Therefore, a coated container excellent in various properties can be obtained according to the present invention.

Optional plastic container formed from a melt-moldable thermoplastic resin by injection molding, blow molding, biaxial draw blow molding or draw forming can be used as the plastic container substrate in the present invention. As the resin that is preferably used for formation of a container substrate, there can be mentioned, for example, low density polyethylene, medium density polyethylene, high density polyethylene, polypropylene, olefin type copolymers such as ethylene/propylene copolymers, ethylene/butene copolymers, ionomers, ethylene/vinyl acetate copolymers and ethylene/vinyl alcohol copolymers, polyesters such as polyethylene terephthalate, polybutylene terephthalate and polyethylene terephthalate/isophthalate, polyamides such as nylon 6, nylon 6,6 and nylon 6,10, polystyrene, styrene type copolymers such as stryene/butadiene block copolymers, styrene/acrylonitrile copolymers, styrene/butadiene/acrylonitrile copolymers (ABS resins), polyvinyl chloride, vinyl chloride type copolymers such as vinyl chloride/vinyl acetate copolymers, polymethyl methacrylate and acrylic copolymers such as methyl methacrylate/ethyl acrylate copolymers, and polycarbonate. These thermoplastic resins may be used singly or in the form of a blend of two or more of them. The plastic container substrate may have a single layer structure or a multi-layer laminate structure formed, for example, by simultaneous melt extrusion.

One of prominent advantages of the present invention is that even if an olefin type resin which is relatively cheap and excellent in the processability but is poor in the gas barrier property is used, a bottle excellent in the gas barrier property can be obtained.

A container substrate used in the present invention can easily be obtained according to a blow molding method in which at least one member selected from the above-mentioned thermoplastic resins is melt-extruded in the form of a parison, supporting the extruded parison in a split mold and blowing a fluid into the parison. In order to obtain a bottle having improved shock resistance and transparency, there may be adopted a method in which a parison or preformed product is prepared by melt extrusion or injection molding, the parison or preformed product is mechanically drawn in the axial direction at a temperature lower than the melting point of the resin and simultaneously drawing the parison or preformed product in the circumferential direction by blowing a fluid into the parison or preformed product to obtain a biaxially oriented plastic bottle. The former blow molding method is effective for molding of polyethylene or polypropylene, and the latter biaxially drawing blow molding method is advantageously applied to molding of polyethylene terephthalate or polypropylene. Still further, a deeply-drawn wide-mouthed bottle formed by subjecting a preformed sheet or film to air-pressure forming or plug assist forming can advantageously be used in the present invention.

The thickness of the plastic container substrate can be changed in a broad range of from a relatively small thickness for a so-called squeeze vessel or light cup to a relatively large thickness for a rigid vessel. The base amount, that is, the weight per unit inner volume, is appropriately chosen from the range of 0.001 to 5 g/ml according to the intended use of the product container.

An aqueous latex or organic solvent solution of a vinylidene chloride copolymer is coated on at least one surface of the above-mentioned plastic container substrate.

As the vinylidene chloride copolymer, there is used a copolymer comprising vinylidene chloride as the main constituent monomer and at least one comonomer selected from an acrylic or methacrylic monomer, a vinyl aromatic monomer such as styrene or vinyl toluene, a vinyl ester such as vinyl acetate or vinyl propionate, a diolefin such as butadiene or isoprene, and methyl vinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinyl succinimide and vinylpyrrolidone. As suitable examples of the acrylic or methacrylic monomer, there can be mentioned acrylic acid, acrylonitrile, acrylamide, methyl acrylate, ethyl acrylate, methyl α-chloroacrylate, propyl acrylate, butyl acrylate, hexyl acrylate, octyl acrylate, cyclohexyl acrylate, glycidyl acrylate, 2-hydroxyethyl acrylate, acrylic acid monoglyceride, phenyl acrylate, methacrylic acid, methacrylonitrile, methacrylamide, methyl methacrylate, amyl methacrylate, glycidyl methacrylate, methacrylic acid monoglyceride, 2-hydroxypropyl methacrylate, β-methoxyethyl methacrylate, β-aminoethyl methacrylate and γ-N,N-diethylaminopropyl methacrylate.

An aqueous latex of the vinylidene chloride copolymer having a solid concentration of 20 to 65% and a viscosity of 3 to 500 centipoises is preferably used in the present invention.

A solution having a solid content of 5 to 60% in an organic solvent such as toluene, tetrahydrofuran, ethyl acetate, methylethyl ketone, cyclohexane, dimethylformamide, dimethylsulfoxide or dioxane is used as the organic solvent solution.

Coating of the plastic container substrate with the above-mentioned copolymer latex or solution may be accomplished by adopting at least one of known coating methods such as dip coating, spray coating, brush coating, roller coating, electrostatic coating, centrifugal coating, cast coating and electrophoretic coating methods. The coating operation may be conducted only once or a multiple stage coating method may be adopted. If desired, the plastic container substrate may be subjected to a wetting property-improving preliminary treatment such as a pretreatment with an anchoring agent, a corona discharge treatment, a surface active agent coating treatment or a chemical etching treatment. Furthermore, in order to impart an electric conductivity, the plastic container substrate may be subjected to a conducting treatment.

In the present invention, it is preferred that the coating layer of the above-mentioned copolymer be formed on both the surfaces of the plastic container substrate. However, in order to shut gases contained in air, the coating layer may be formed on the outer surface alone, and in order to prevent escape of a gas or perfume from the content of the container, the coating layer may be formed on the inner surface alone.

As pointed out hereinbefore, the vinylidene chloride copolymer that is used in the present invention is excellent in the combination of the oxygen barrier property and water vapor barrier property and the humidity dependency of the oxygen barrier property is very low. Accordingly, when the copolymer is formed on the plastic container substrate in the form of a very thin layer, excellent barrier properties to various gases can be obtained. More specifically, satisfactory results can ordinarily be obtained if the copolymer is formed in a layer having a thickness of 0.5 to 40μ, especially 1 to 30μ.

The conditions adopted for drying the coated copolymer layer are changed according to the thickness of the coating layer, but ordinarily, a sufficient drying effect can be attained when drying is carried out at a temperature of 40° to 150° C. for about 2 seconds to about 100 hours.

According to the present invention, simultaneously with or subsequently to the drying step, the coating layer is maintained at the crystallization temperature of the vinylidene chloride copolymer to effect crystallization. Since formation of a film of the vinylidene chloride copolymer is not substantially advanced in the presence of water or an organic solvent, it is necessary that the coating layer should be maintained at the crystallization temperature in the substantial absence of water or the organic solvent.

In the present invention, the heat treatment of the coating layer is carried out so that the following requirements are satisfied:

$$423° K. \geq T \geq 313° K., \text{ and} \quad (1)$$

$$500 \geq \lim_{\log a \to 0} \int_a^t \frac{(T - 313)}{k} d\log t \geq 10$$

especially, $$300 \geq \lim_{\log a \to 0} \int_a^t \frac{(T - 313)}{k} d\log t \geq 30 \quad (2)$$

wherein T stands for the temperature (°K) for the heat treatment of the coating layer, t stands for the time (seconds) of the heat treatment conducted at T°K, and k is a constant determined according to the kind of the vinylidene chloride copolymer, which is ordinarily in the range of $5 \geq k \geq 0.5$.

If the temperature-time integration value is too small and is below the above range, the crystallization is not sufficient and it is difficult to increase the adhesion to a satisfactory level. If this value is too large and exceeds the above range, the coating layer of the vinylidene chloride copolymer is thermally deteriorated and physical properties are rather degraded.

When crystallization is effected at the drying step, there is advantageously adopted a method in which the maximum temperature attained at the drying step is adjusted to at least 50° C., the subsequent cooling rate is controlled to at least 2° C./min to effect crystallization and after the temperature-time integration value becomes within the above range, the coating layer is rapidly cooled. When crystallization is effected independently from the drying step, the heat treatment is carried out under such conditions that the above requirements are satisfied.

In order to protect the above-mentioned coating layer and improve the weatherability, scratch resistance and gas barrier property thereof, a protecting layer composed of a film-forming synthetic resin, other than the vinylidene chloride copolymer, may be formed adjacently to the coating layer according to the known coating and drying procedures.

The present invention will now be described in detail with reference to the following Examples that by no means limit the scope of the invention.

In the Examples, the crystallization degree, freeze peeling degree, low temperature adhesion strength (falling strength), scratch resistance (pencil hardness), chemical resistance, hot water resistance (boiling test) and oxygen permeation rate of each coating layer were determined according to the following methods.

(1) Crystallization Degree:

The crystallization degree was determined according to the method disclosed on page 679 of "Emulsion Latex Handbook" (compiled by Editional Conference of Emulsion Latex Handbook and published by Daisensha). More specifically, the side wall portion was cut out from a coated container and the absorption spectrum of the coated surface was determined according to the total reflection method transmission method or differential spectrum method using an infrared spectrophotometer (Model A-3 supplied by Nippon Bunko Kogyo). Among absorption bands characteristic of vinylidene chloride, which appear at 743, 875, 1046 and 1071 cm$^{-1}$, the absorption bands at 1046 and 1071 cm$^{-1}$ are considered to indicate the degree of crystallization. Accordingly, the ratio of the absorbances at 1046 and 1071 cm$^{-1}$ was designated as the crystallization degree. From the results of the X-ray diffractometry, it is proved that increase of the above-mentioned absorbance ratio means advance of crystallization in the internal structure of polyvinylidene chloride. Examples of the results of the measurement of the absorption spectrum and absorbances are shown in FIG. 2. Incidentally, FIG. 2 shows the results obtained with respect to a sample formed by coating a vinylidene chloride latex on a polyethylene film. The absorption bands at 720, 1350, 1425 and 2900 cm$^{-1}$ are those characteristic of polyethylene.

(2) Freeze Peeling Degree:

A coated container, the weight of which had been measured in advance, was filled with distilled water, and water was frozen and expanded at $-15°$ C. The coating which was observed to have been peeled was removed from the container, and the weight of the empty container was then measured. The peeling degree (%) was calculated by dividing the difference between the weight of said container and the weight of the container before the freezing by the total amount of the coating according to the following formula:

$$\text{Peeling degree (\%)} = \frac{[(\text{weight before freezing}) - (\text{weight after freezing})]}{\text{total amount of coating}} \times 100$$

(3) Low Temperature Adhesion Strength (falling strength):

A coated container was filled with an aqueous solution of sodium chloride (the sodium chloride concentration was 10% by weight) maintained at $-1°$ C., and the container was plugged and was let to fall down on the concrete surface from a height of 1.5 mm so that the side face of the container impinged against the concrete surface. For each coating condition, five sample containers were tested. Then, in order to determine whether or not micro-cracks were formed, the side wall portion of the bottle subjected to the falling test was cut out and was dyed at 50° C. for 5 minutes in a dyeing aqueous solution of Malachite Green, and the side wall portion was observed by a microscope (100 magnifications).

The falling strength was evaluated according to the following scale:

◯ : no cracks were formed in any of the five samples.
Δ: cracks were formed in 1 to 4 samples.
X: cracks were formed in all of the five samples.

(4) Scratch Resistance (pencil hardness):

Under conditions of a temperature of 20° C. and a relative humidity of 40%, a weight of 0.5 Kg was placed on each of pencils having a hardness in the range of from 6B to 6H, and lines having a length of about 2 cm were drawn on the coated surface of a barrel portion cut out from a sample container. Then, pencil dusts left on the surfaces were swept away, and the surface of the sample container was examined by a magnifying glass of 10 magnifications and the scratch resistance was evaluated based on the hardness of the pencil which left a scratch on the surface. Accordingly, the pencil hardness 6B indicates the lowest scratch resistance, and the scratch resistance is increased in the order of 5B, 4B, 3B, 2B, B, HB, F, H, 2H, 3H, 4H and 5H and the pencil hardness 6H indicates the highest scratch resistance.

(5) Hot Water Resistance:

A square sample of about 3 cm × about 3 cm was cut out from the barrel wall of the coated container and was boiled in a thermostat hot water tank maintained at 95° C. for 30 minutes. Then, the sample was taken out from the tank and the whitening state was visually examined by a panel of five experts. Symbols shown in the following Examples have the following meanings:

◯ : five or four experts judged that whitening did not occur.

Δ: two or three experts judged that whitening did not occur.

X: one or none of the five experts judged that whitening did not occur.

(6) Chemical Resistance:

The side wall portion of the coated container was cut out and immersed in an aqueous solution containing 10% by weight of caustic soda at 25° C. overnight. Before this immersion treatment, the total transmission of rays having a visible range wavelength of 400 mμ was measured with respect to the sample by using an integrating ball in a self-recording spectrophotometer (supplied by Hitachi), and the total transmission was similarly measured after the treatment with the aqueous solution of caustic soda. The chemical resistance was evaluated based on the deterioration degree expressed by the ratio Tafter/Tbefore, in which Tbefore represents the total transmission of the sample before the caustic soda treatment and Tafter represents the total transmission of the sample after the caustic soda treatment. A smaller value of the deterioration degree means a larger deterioration.

(7) Gas Barrier Property:

As the gas barrier property, the oxygen permeation rate ($QO_2$) at a temperature of 20° C. and a relative humidity of 0% was measured according to the following procedures.

A barrel wall of a container to be measured was cut into a predetermined size and an obtained sheet-like sample was used for the measurement. A gas permeation tester manufactured by Toyo Tester Kogyo K.K. was used for the measurement. The sample was fixed between two chambers of this tester, and suction was effected in one chamber so that the pressure was reduced below $10^{-2}$ mmHg (low pressure side) while in the other chamber (high pressure side), the atmosphere was replaced by dehumidified oxygen gas so that the oxygen gas pressure was one atmosphere. The change of the pressure increase with the lapse time was read on a recorder and the oxygen gas permeation rate $QO_2$ was determined from the read values.

The measurement was carried out at 20° C. and the moisture was removed from the high pressure side chamber so that the relative humidity was 0%.

EXAMPLE 1

An anchoring agent (EL-220/EL-200-AD supplied by Toyo Morton K.K.) was coated on the inner surface of a biaxially drawn cylindrical polypropylene bottle having an inner volume of 1000 cc, a weight of 30 g and an average thickness of 0.45 mm, and the coated bottle was subjected to heat treatment at 100° C. for 30 seconds. Then, an emulsion of a polyvinylidene chloride type resin having a composition comprising 90% by weight of vinylidene chloride and 10% by weight of vinyl chloride (dispersion medium=water, solid concentration=45%) was coated on the bottle and dried at 70° C. for 2 minutes in a perfect oven (explosion-proof type). The average amount coated of the polyvinylidene chloride type resin (the average thickness) was 11μ. The coated bottle was heat-treated in the same perfect oven at 50° C. for 30 minutes, 1 hour, 3 hours, 10 hours, 24 hours, 2 days, 1 week or 1 month. The crystallization degree, freeze peeling degree, low temperature adhesion, scratch resistance, hot water resistance, chemical resistance and oxygen permeation rate were determined according to the above-mentioned methods. The obtained results are shown in Table 1.

TABLE 1

| Heat Treatment Time | Crystallization Degree | Freeze Peeling Degree (%) | Falling Strength | Pencil Hardness | Hot Water Resistance | Chemical Resistance | $QO_2$ (cc/m$^2$ · day · atm) |
|---|---|---|---|---|---|---|---|
| 30 minutes | 0.52 | 62 | X | 2H | X | 0.31 | 27 |
| 1 hour | 0.54 | 59 | X | 2H | X | 0.35 | 24 |
| 3 hours | 0.70 | 47 | X | 3H | X | 0.62 | 21 |
| 10 hours | 1.00 | 23 | △ | 3H | X | 0.76 | 16 |
| 24 hours | 1.07 | 10 | △ | 4H | X | 0.83 | 13 |
| 2 days | 1.12 | 1 | ○ | 4H | △ | 0.90 | 10 |
| 1 week | 1.23 | 0 | ○ | 4H | △ | 0.91 | 8 |
| 1 month | 1.23 | 0 | ○ | 4H | △ | 0.91 | 8 |

From the results shown in Table 1, it will readily be understood that with increase of the crystallization degree, the freeze peel strength, low temperature adhesion strength, scratch resistance, chemical resistance, hot water resistance and gas barrier property are improved.

EXAMPLE 2

The outer surface of a cylindrical polycarbonate bottle having an inner volume of 400 cc, a weight of 12 g and an average thickness of 0.30 mm was spray-coated with a solution of a vinylidene chloride copolymer having a composition comprising 90% by weight of vinylidene chloride, 5% by weight of acrylonitrile and 5% by weight of methacrylonitrile (solvent=tetrahydrofuran, solid concentration=20%). Then, the coated bottle was dried at 80° C. for 90 seconds in a perfect oven (explosion-proof type). The average amount coated of the polyvinylidene chloride type resin (average thickness) was 6μ. The coated bottle was heat-treated for 10 minutes in the perfect oven set at 30°, 50°, 80°, 100° or 150° C. Then, the crystallization degree, freeze peel strength, low temperature adhesion strength (falling strength), scratch resistance (pencil hardness), hot water resistance, chemical resistance and gas barrier property were measured according to the above-mentioned methods. The obtained results are shown in Table 2.

TABLE 2

| Heat Treatment Temperature | Crystallization Degree | Freeze Peeling Degree (%) | Falling Strength | Pencil Hardness | Hot Water Resistance | Chemical Resistance | $QO_2$ (cc/m$^2$ · day · atm) |
|---|---|---|---|---|---|---|---|
| 30° C. | 0.43 | 54 | X | 2H | X | 0.25 | 41 |
| 50° C. | 0.60 | 48 | X | 2H | X | 0.56 | 35 |
| 70° C. | 1.12 | 20 | △ | 3H | △ | 0.82 | 23 |
| 100° C. | 1.24 | 0 | ○ | 4H | ○ | 0.90 | 19 |
| 150° C. | 1.00 | 10 | X | 2H | X | 0.83 | 33 |

From the results shown in Table 2, it will readily be understood that with increase of the crystallization degree, the freeze peel strength, low temperature adhesion strength, scratch resistance, chemical resistance, hot water resistance and gas barrier property are improved. It is considered that at the heat treatment temperature of 150° C., thermal deterioration is probably caused because the temperature-time integration value exceeds the range defined by the formula (2).

EXAMPLE 3

The outer surface of a biaxially drawn polyethylene terephthalate cylindrical bottle having an inner volume of 1000 cc, a weight of 45 g and an average thickness of 0.64 mm was dip-coated with a latex of a vinylidene chloride copolymer having a composition comprising 85% by weight of vinylidene chloride, 5% by weight of methyl acrylate and 10% by weight of glycidyl methacrylate (dispersion medium=water, solid concentration=43%). Then, the coated bottle was dried at 70° C. for 20 minutes in an air-circulating oven. This bottle is designated as "bottle A". The bottle A was spray-coated with an acrylate latex (Nypol LX860 supplied by Japanese Geon, solid concentration=45%) to form a topcoat. The obtained bottle is designated as "bottle B". The bottles A and B were heat-treated at 100° C. for 1 minute in an air-circulating oven, and the crystallization degree, freeze peel strength, scratch resistance, hot water resistance and gas barrier property were measured according to the above-mentioned methods. The obtained results are shown in Table 3.

TABLE 3

| Bottle | Crystallization Degree | Freeze Peeling Degree (%) | Scratch Resistance | Hot Water Resistance | $QO_2$ (cc/m$^2$ · day · atm) |
|---|---|---|---|---|---|
| A | 1.05 | 5 | 3H | △ | 6.1 |
| B | 1.06 | 0 | 5H | ○ | 4.8 |

From the results shown in Table 3, it will readily be understood that if the crystallization degree is increased and a topcoat is simultaneously formed, the freeze peel strength, scratch resistance, hot water resistance and gas barrier property are further improved.

EXAMPLE 4

The outer surface of a polycarbonate bottle as described in Example 2 was spray-coated with the same polyvinylidene chloride resin emulsion as described in Example 1. The average amount coated of the polyvinylidene chloride resin (average thickness) was 9μ. The coated bottle was dried at 120° C. in a perfect oven (explosion-proof type) for 1 minute, 2 minute, 5 minute or 30 minutes. The crystallization degree was measured according to the above-mentioned method. The obtained results are shown in Table 4.

TABLE 4

| Drying Time (minutes) | Crystallization Degree |
|---|---|
| 1 | 0.47 |
| 2 | 1.03 |
| 5 | 1.35 |

TABLE 4-continued

| Drying Time (minutes) | Crystallization Degree |
| --- | --- |
| 30 | 1.21 |

From the results shown in Table 4, it will readily be understood that if the heat treatment is conducted subsequently to the drying, the effect of increasing the crystallization degree is enhanced. However, if the treating time is 30 minutes, the temperature-time integration value exceeds the range defined by the formula (2) and therefore, the crystallization degree is reduced.

EXAMPLE 5

The inner surface of a multi-layer cup (wide-mouth square vessel) having a length of 9.7 cm, a width of 9.7 cm, a height of 3.2 cm and an average thickness of 0.47 mm and comprising an inner layer of an ethylene/vinyl alcohol copolymer, an intermediate layer of an adhesive (maleic anhydride-modified polypropylene) and an outer layer of polypropylene was spray-coated with the same vinylidene chloride copolymer latex as described in Example 1. Then, the coated cup was dried at 70° C. for 2 minutes in an air-circulating oven and was heat-treated at 130° C. for 20 seconds in the same oven. Then, the cup was cooled instantaneously or at a cooling rate of 20° C./min, 5° C./min or 1° C./min. The crystallization degree was measured according to the above-mentioned method. The obtained results are shown in Table 5.

TABLE 5

| Cooling Rate (°C./min) | Crystallization Degree |
| --- | --- |
| instantaneously | 1.25 |
| 20 | 1.25 |
| 5 | 1.10 |
| 1 | 0.98 |

From the results shown in Table 5, it will readily be understood that it is preferred that the rate of cooling to be conducted after the heat treatment be as high as possible.

EXAMPLE 6

The same biaxially drawn polypropylene bottle having the outer surface coated with the polyvinylidene chloride type resin emulsion, as described in Example 1, was heat-treated in an air-circulating oven maintained at 50° C., 80° C., 100° C. or 130° C. under conditions providing a highest degree of crystallization at said heat treatment temperature. The obtained results are shown in Table 6.

TABLE 6

| Heat Treatment Temperature | Treatment Time | Crystallization Degree |
| --- | --- | --- |
| 50° C. | 3 days | 1.23 |
| 80° C. | 1 hour | 1.28 |
| 100° C. | 2 minutes | 1.32 |
| 130° C. | 20 seconds | 1.34 |

From the results shown in Table 6, it will readily be understood that there exists an optimum temperature for increasing the crystallization degree and in case of the polyvinylidene chloride type resin described in Example 1, 130° C. or a higher temperature is preferred.

COMPARATIVE EXAMPLE 1

The crystallization degree (lowest film-forming temperature) of the vinylidene chloride emulsion described in Example 1 was increased (raised) in advance, and the emulsion was coated on a bottle as used in Example 1 according to the method adopted in Example 1. The coated bottle was then dried. The average amount coated of the vinylidene chloride resin (average thickness) was 11μ. Then, the bottle was heat-treated under the conditions described in Example 2. The crystallization degree, freeze peel strength, low temperature adhesion strength, scratch resistance, hot water resistance, chemical resistance and oxygen permeation rate were determined according to the above-mentioned methods. The obtained results are shown in Table 7.

TABLE 7

| Heat Treatment Temperature | Crystallization Degree | Freeze Peeling Degree (%) | Falling Strength | Pencil Hardness | Hot Water Resistance | Chemical Resistance | $QO_2$ (cc/m² · day · atm) |
| --- | --- | --- | --- | --- | --- | --- | --- |
| 30° C. | 1.12 | 56 | X | H | X | 0.30 | 60 |
| 50° C. | 1.12 | 60 | X | H | X | 0.22 | 65 |
| 70° C. | 1.18 | 63 | X | F | X | 0.16 | 80 |
| 100° C. | 1.26 | 70 | X | HB | X | 0.13 | 103 |
| 150° C. | 1.13 | 83 | X | 2B | X | 0.08 | 112 |

When the results shown in Table 7 are compared with the results shown in Table 1, it will readily be understood that when the degree of crystallization is increased in the latex state in advance, the freeze peel strength, low temperature adhesion strength, scratch resistance, chemical resistance, hot water resistance and gas barrier property are reduced and that the method in which the degree of crystallization is increased after formation of the latex into a film is effective.

COMPARATIVE EXAMPLE 2

In Example 2, after the heat treatment was conducted at 100° C. for 10 minutes, the sample was allowed to stand in the perfect oven, and in this state, the connection of the oven to a power source was cut and the bottle was naturally cooled. Just after the connection to the power source was cut, the cooling rate was 1.7° C./min.

After passage of one night, reduction of the temperature to room temperature was confirmed, and the sample was taken out from the oven. The crystallization degree, freeze peel strength, low temperature adhesion strength, scratch resistance, hot water resistance, chemical resistance and oxygen permeation rate were measured according to the above-mentioned methods. The obtained results are shown in Table 8.

TABLE 8

| Crystallization Degree | 1.22 |
| --- | --- |

TABLE 8-continued

| | |
|---|---|
| Freeze Peeling Degree (%) | 5 |
| Falling Strength | Δ |
| Pencil Hardness | 2H |
| Hot Water Resistance | Δ |
| Chemical Resistance | 0.78 |
| $QO_2$ (cc/m$^2$ · day · atm) | 29 |

When the results shown in Table 8 are compared with the results of the heat treatment conducted at 100° C. for 10 minutes, which are shown in Table 2, it is seen that by the excessive heat treatment, the degree of crystallization is reduced and the properties are degraded. Thus, it is confirmed that it is preferred that after the heat treatment is conducted within a range defined by the formula (1) so as to obtain a highest degree of crystallization, cooling be carried out as promptly as possible.

What is claimed is:

1. A process for the preparation of a coated plastic container, which comprises coating an aqueous latex or organic solvent solution of a vinylidene chloride copolymer on at least one surface of a plastic container formed by hot molding of a thermoplastic resin, drying the coating and heat-treating the coating simultaneously with or subsequently to the drying step to crystallize the coating until the degree of crystallization is at least 0.5 as measured according to the infrared absorption spectrum method.

2. The process according to claim 1, wherein the formed coating is heat-treated so that the following requirements are satisfied, thereby to effect crystallization:

$$423° K. \geq T \geq 313° K., \text{ and}$$

$$500 \geq \lim_{\log a \to 0} \int_a^t \frac{(T-313)}{k} d\log t \geq 10$$

wherein T stands for the temperature (°K) for the heat treatment of the coating layer, t stands for the time (seconds) of the heat treatment conducted at T°K, and k is a constant determined according to the kind of the vinylidene chloride copolymer, which is ordinarily in the range of $5 \geq k \geq 0.5$.

3. The process of claim 2 which comprises carrying out the drying step and heat-treating step to crystallize the coating simultaneously.

4. The process of claim 3 wherein the maximum temperature reached at the drying step is at least 50° C. and wherein the coated plastic container is subsequently cooled at a cooling rate of at least 2° C./min to effect crystallization and the coating layer is then rapidly cooled.

5. The process of claim 2 wherein the step of heat-treating the coating to crystallize the coating is carried out subsequently to the drying step.

6. The process of claim 1 wherein the degree of crystallization of the coating is at least 0.8 as measured according to the infrared absorption spectrum method.

7. The process of claim 1 wherein said plastic container is formed from at least one thermoplastic resin selected from the group consisting of polyethylene, polypropylene, olefin copolymers, polyesters, polyamides, polystyrene, styrene copolymers, polyvinylchloride, vinyl chloride copolymers, polymethylmethacrylate, acrylic copolymers, polycarbonate and mixtures thereof.

8. The process of claim 1 wherein said vinylidene chloride copolymer is a copolymer comprising vinylidene chloride as the main constituent monomer and at least one comonomer selected from the group consisting of an acrylic monomer, a methacrylic monomer, a vinyl aromatic monomer, a vinyl ester, a diolefin, methylvinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinyl succinimide, vinylpyrrolidone and mixtures thereof.

9. The process of claim 1 wherein an aqueous latex of the vinylidene copolymer is used, said latex having a solid concentration of 20 to 65% and a viscosity of 3 to 500 centipoises.

10. The process of claim 1 wherein said organic solvent solution of the vinylidene chloride copolymer is used, said solution having a solid content of 5 to 60% in an organic solvent selected from the group consisting toluene, tetrahydrofuran, ethyl acetate, methylethyl ketone, cyclohexane, dimethylformamide, dimethylsulfoxide and dioxane.

11. The process of claim 1 which comprises coating the aqueous latex or organic solvent solution of the vinylidene chloride copolymer on both surfaces of the plastic container.

12. The process of claim 1 wherein the thickness of the coating of the vinylidene chloride copolymer is from 0.5 to 40 microns.

13. The process of claim 1 wherein the coating is dried at a temperature of 40° to 150° C. for about 2 seconds to about 100 hours.

* * * * *

REEXAMINATION CERTIFICATE (541st)
United States Patent [19]
Maruhashi et al.

[11] B1 4,478,889
[45] Certificate Issued Jul. 22, 1986

[54] PROCESS FOR PREPARATION OF COATED PLASTIC CONTAINER

[75] Inventors: Yoshitsugu Maruhashi, Yokohama; Isao Tanikawa, Ayase; Sadao Hirata, Kamakura, all of Japan

[73] Assignee: Toyo Seikan Kaisha, Ltd., Tokyo

Reexamination Request:
No. 90/000,839, Aug. 19, 1985

Reexamination Certificate for:
Patent No.: 4,478,889
Issued: Oct. 23, 1984
Appl. No.: 438,758
Filed: Nov. 3, 1982

[30] Foreign Application Priority Data

Nov. 5, 1981 [JP] Japan .................. 56-176368

[51] Int. Cl.$^4$ ........................... B05D 7/22
[52] U.S. Cl. ..................... 427/230; 427/160; 427/379; 427/393.5
[58] Field of Search ............ 427/160, 230, 379, 393.5

[56] References Cited

U.S. PATENT DOCUMENTS

| | | | |
|---|---|---|---|
| 2,897,100 | 7/1959 | Grenley et al. | 117/138.8 |
| 2,985,542 | 5/1961 | Pinsky et al. | 117/138.8 |
| 3,134,684 | 5/1964 | Northrop et al. | 117/15 |
| 3,313,757 | 4/1967 | Trofimow et al. | 260/29.6 |
| 3,322,614 | 5/1967 | Seiferth et al. | 428/518 X |
| 3,328,196 | 6/1967 | Sincock | 117/76 |
| 3,353,991 | 11/1967 | Shelburg et al. | 117/138.8 |
| 3,353,992 | 11/1967 | Grenley et al. | 117/138.8 |
| 3,380,844 | 4/1968 | Menikheim et al. | 117/47 |
| 3,438,788 | 4/1969 | Gifford et al. | 99/171 |
| 3,449,479 | 6/1969 | Cines | 264/92 |
| 3,468,703 | 9/1969 | Gibbs et al. | 117/155 |
| 3,468,994 | 9/1969 | Gilbert | 264/94 |
| 3,557,041 | 1/1971 | Loshaek et al. | 260/29.6 |
| 3,589,506 | 6/1971 | Ford et al. | 206/46 |
| 3,661,677 | 5/1972 | Wang | 156/315 |
| 3,723,168 | 3/1973 | Utz et al. | 117/94 |
| 3,746,196 | 7/1973 | Sako et al. | 215/1 C |
| 3,804,663 | 4/1974 | Clark | 117/101 |
| 3,850,671 | 11/1974 | Petty et al. | 117/64 C |
| 3,922,451 | 11/1975 | Anschutz et al. | 428/35 |
| 4,041,235 | 8/1977 | Suzuki et al. | 428/413 |
| 4,127,633 | 11/1978 | Addleman | 264/97 |
| 4,254,170 | 3/1981 | Roullet et al. | 428/36 |

FOREIGN PATENT DOCUMENTS

2404512 8/1975 Fed. Rep. of Germany .
2014160 8/1979 United Kingdom .

*Primary Examiner*—Bernard D. Pianalto

[57] ABSTRACT

Disclosed is a process for the preparation of a coated plastic container, which comprises coating an aqueous latex or organic solvent solution of a vinylidene chloride copolymer on at least one surface of a plastic container formed by hot molding of a thermoplastic resin, drying the coating and crystallizing the coating simultaneously with or subsequently to the drying step.

In the coated plastic container prepared according to this process, the adhesion of the coating layer of the vinylidene chloride copolymer to the plastic container substrate is highly improved, and even under severe conditions, peeling of the coating layer is prevented. Moreover, the gas barrier property, strength and chemical resistance of the container are prominently improved.

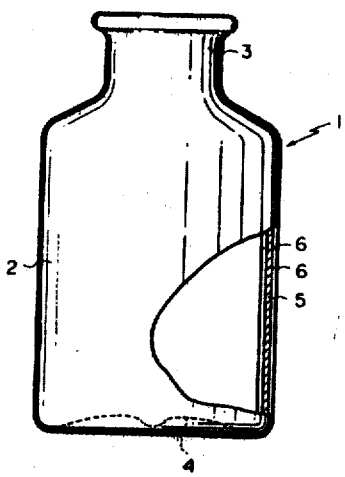

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 is cancelled.

Claim 1 is determined to be patentable as amended.

Claims 2-5 and 7-13, dependent on an amended claim, are determined to be patentable.

New claim 14 is added and determined to be patentable.

1. A process for the preparation of a coated plastic container, which comprises coating an aqueous latex or organic solvent solution of *a polymer consisting essentially of* a vinylidene chloride copolymer on at least one surface of a plastic container formed by hot molding of a thermoplastic resin, drying the coating and heat-treating the coating *layer consisting essentially of the vinylidene chloride copolymer* simultaneously with or subsequently to the drying step *in the substantial absence of water or the organic solvent* to crystallize the coating until the degree of crystallization is at least [0.5] *0.8* as measured according to the infrared absorption spectrum method *and cooling the crystallized coating at a cooling rate of at least 2° C./min.*

*14. The process of claim 1 wherein the vinylidene chloride copolymer in the aqueous latex or organic solvent solution has a degree of crystallization lower than 0.5 as measured according to the infrared absorption spectrum method.*

* * * * *